United States Patent

Lenoir

Patent Number: 5,767,056
Date of Patent: Jun. 16, 1998

[54] AQUEOUS ALKALINE COMPOSITION

[75] Inventor: Pierre Marie Lenoir, Richterswil, Switzerland

[73] Assignee: The Dow Chemical Company, Midland, Mich.

[21] Appl. No.: 663,861

[22] Filed: Jun. 19, 1996

Related U.S. Application Data

[63] Continuation of Ser. No. 333,454, Nov. 2, 1994, abandoned.

[30] Foreign Application Priority Data

Nov. 5, 1993 [GB] United Kingdom ................ 9322806

[51] Int. Cl.$^6$ .............................. C11D 1/722; C11D 1/83; C11D 7/06
[52] U.S. Cl. ................... 510/423; 510/272; 510/421; 510/422; 510/424; 510/437; 510/470; 510/499; 510/501
[58] Field of Search ..................... 510/272, 421, 510/422, 437, 470, 499, 501, 423, 424

[56] References Cited

U.S. PATENT DOCUMENTS

| | | | |
|---|---|---|---|
| 3,507,798 | 4/1970 | Egan et al. | 252/135 |
| 4,206,074 | 6/1980 | Perner | 252/351 |
| 4,280,919 | 7/1981 | Stoeckigt et al. | 252/135 |
| 4,438,014 | 3/1984 | Scott | 252/174.21 |
| 4,443,363 | 4/1984 | Klinger et al. | 252/547 |
| 4,508,635 | 4/1985 | Clarke | 252/174.23 |
| 4,784,798 | 11/1988 | Geke et al. | 252/544 |
| 4,965,014 | 10/1990 | Jeschke et al. | 252/174.22 |
| 5,034,159 | 7/1991 | Tesmann et al. | 252/551 |
| 5,035,814 | 7/1991 | Maaser | 252/8.7 |
| 5,126,068 | 6/1992 | Burke et al. | 252/174.21 |
| 5,385,696 | 1/1995 | Repinectr et al. | 252/546 |
| 5,415,797 | 5/1995 | Ishida et al. | 252/135 |
| 5,415,806 | 5/1995 | Pepe et al. | 252/174.21 |
| 5,417,891 | 5/1995 | Gomes et al. | 252/552 |
| 5,420,211 | 5/1995 | Hughes et al. | 525/404 |
| 5,516,452 | 5/1996 | Welch et al. | 252/174.22 |

FOREIGN PATENT DOCUMENTS

| | | |
|---|---|---|
| 0014980 | 9/1980 | European Pat. Off. . |
| 0034194 | 8/1981 | European Pat. Off. . |
| 0120533 | 10/1984 | European Pat. Off. . |
| 2540511 | 8/1984 | France . |
| 1924332 | 11/1970 | Germany . |
| 4115149 | 11/1992 | Germany . |
| 2145726 | 4/1985 | United Kingdom . |

*Primary Examiner*—Ardith Hertzog
*Assistant Examiner*—Gregory R. Delcotto

[57] ABSTRACT

The aqueous composition comprises a non-ionic surfactant and an alkali metal hydroxide.

The non-ionic surfactant is a propylene oxide-ethylene oxide derivative of an alcohol of formula I $$R-O-[C_2H_3(CH_3)O]_a-[C_2H_4O]_b-H \qquad (I)$$

and/or a butylene oxide-ethylene oxide derivative of an alcohol (ROH), of formula II $$R-O-[C_2H_3(C_2H_5)O]_c-[C_2H_4O]_b-H \qquad (II)$$

wherein

R is a linear or branched alkyl or alkenyl group containing from 4 to 11 carbon atoms, a (the average degree of propoxylation per mole) is from 2.5 to 7, b (the average degree of ethoxylation per mole) is from 1 to 10, and c (the average degree of butoxylation per mole) is from 0.5 to 4.

The content of the alkali metal hydroxide is at least 5 percent, based on the total weight of the aqueous composition.

The aqueous alkaline solution is useful for cleaning the surface of articles, such as fruit, vegetables or containers for food, or for chemical peeling of fruit or vegetables, metal working or cotton mercerization.

14 Claims, No Drawings

AQUEOUS ALKALINE COMPOSITION

CROSS-REFERENCE TO RELATED APPLICATION

This is a continuation of application Ser. No. 08/333,454, filed Nov. 2, 1994, now abandoned.

BACKGROUND OF THE INVENTION

This invention relates to a composition of a non-ionic surfactant and an alkali metal hydroxide particularly a propylene oxide-ethylene oxide derivative of an alcohol or a butylene oxide-ethylene oxide derivative of an alcohol.

Aqueous compositions which comprise a non-ionic surfactant and an alkali metal hydroxide are useful in various applications, such as chemical peeling or washing of fruit or vegetables, metal degreasing or cotton mercerization. Such compositions are also useful as cleaning compositions, for example to wash containers for food, for mechanical dishwashing and particularly for industrial washing of containers which are recycled and utilized several times, such as bottles. The non-ionic surfactant comprised in such aqueous alkaline compositions improves the wetting and cleaning ability of the compositions. The surfactant should exhibit a good wetting behavior and low foaming. In order to reduce the costs for transportation, the aqueous alkaline compositions are usually produced and transported as concentrates containing a very high concentration, often up to saturation, of alkali metal hydroxide. These concentrates are diluted with water prior to their use. Therefore, the non-ionic surfactant should have a sufficiently high solubility in the aqueous alkaline composition, even if it contains a large amount of alkali metal hydroxide. The non-ionic surfactant should also be biodegradable.

Published French Patent Application 2,540,511 discloses strongly alkaline compositions which contain from 80 to 95 percent of a 50 percent aqueous solution of sodium hydroxide, 1 to 5 percent of complexing agents, 0.5 to 2.5 percent of copolymers of ethylene oxide and propylene oxide and 0.5 to 2.5 percent of a sucroglyceride, all percentages being by weight. The use of the strongly alkaline composition for industrial bottle washing is disclosed.

Propylene oxide/ethylene oxide block copolymers of a molecular weight of about 2,000 to 3,000 have been widely used as non-ionic surfactants in aqueous strongly alkaline compositions. Unfortunately, these propylene oxide/ethylene oxide block copolymers are poorly biodegradable.

Published German Patent Application 1,924,332 discloses a strongly alkaline, storage stable, viscous liquid or pasty cleaner for ovens and grills. The cleaner comprises 4 to 20 percent of caustic alkali, 1 to 15 percent of a thickener, 2 to 18 percent of a glycol and 0.2 to 3 percent of a non-ionic surfactant, all percentages being by weight. The non-ionic surfactant is an addition product of an alkylene oxide with a higher fatty alcohol containing 8 to 20, preferably 12 to 18 carbon atoms and/or with an alkyl phenol containing 8 to 15 carbon atoms in the alkyl radical. The addition product is produced by reacting 2 to 30 mols, preferably 5 to 20 mols of ethylene oxide with the higher fatty alcohol or the alkyl phenol. A small portion of the ethylene oxide may be replaced by propylene oxide. Unfortunately, this surfactant is not sufficiently soluble in highly concentrated aqueous compositions which contain up to 45 weight percent of caustic alkali. Furthermore, expensive glycol solvent is needed to provide a formulation of good physical stability.

U.S. Pat. No. 4,443,363 discloses a detergent composition composed of a non-ionic surfactant and a quaternary ammonium compound as a cationic surfactant. The non-ionic surfactant is an addition reaction product of an alcohol having 6-18 carbon atoms with ethylene oxide and propylene oxide units. The ethylene oxide and propylene oxide units are present in the form of blocks and at least a part, preferably all, of the propylene oxide are added by condensation after the addition reaction of the ethylene oxide. The detergent composition is suitable for the mechanical cleaning of hard surfaces in highly alkaline liquors at pH values of at least 10. Unfortunately, the suggested non-ionic surfactant is not sufficiently soluble in highly concentrated aqueous compositions which contain up to 45 weight percent of an alkali metal hydroxide.

Published European Patent Application 0,120,533 discloses an alkaline-built liquid detergent composition which comprises:

(a) at least 2 percent by weight of an alkoxylated fatty alcohol non-ionic detergent having in the alkylene oxide radical an overall ratio between the number of ethylene-oxide units and the number of propylene and/or butylene oxide units of less than 9

(b) from 2 to 30 percent by weight of an alkaline agent;

(c) from 10 to 30 percent by weight of a detergency builder; and (d) from 0.1 to 1.0 percent by weight of an essentially single structuring polymeric agent.

The composition has a pH equal to or above 11. The alkaline agent is an alkali metal hydroxide and/or silicate. The detergency builder is a phosphate builder, such as the alkali metal salts of triphosphoric acid, pyrophosphoric acid and mixtures thereof or carbonates, zeolites and organic builders. The non-ionic detergent (a) is a fatty alcohol condensed with a mixture of ethylene oxide and propylene oxide and/or butylene oxide.

The abstract of JP 61060892 A discloses an alkaline cleaning bath used for a surface cleaning of metallic substrates. The alkaline cleaning bath contains an alkali builder and a surfactant of the formula R—O—(EO)$_m$—(PO)$_n$—H, wherein R is an alkyl group, EO is ethylene oxide and PO is propylene oxide. The alkali builder is e.g. sodium silicate, sodium phosphate, sodium hydroxide, sodium pyrophosphate or sodium carbonate in a concentration of 0.4 to 8.0 g/l. Unfortunately, the suggested non-ionic surfactant is not sufficiently soluble in highly concentrated aqueous compositions which contain up to 45 weight percent of an alkali metal hydroxide.

European Patent Application 0,014,980 discloses a powdery cleaner for dishes containing 20 to 55 percent of an alkali phosphate, 30 to 60 percent of an alkali metasilicate, 2 to 15 percent of an alkali hydroxide and/or carbonate, 0 to 8 percent of a water-soluble alkali silicate, 1 to 10 percent of a compound releasing active chlorine, such as potassium or sodium dichloroisocyanurate, 0.5 to 5 percent, preferably 0.8 to 2 percent, of a non-ionic surfactant, 0.2 to 2.5 percent of a water-soluble polyethylene glycol of an average molecular weight of 300,000 to 4,000,000 and 0 to 20 percent of water, by the total weight of the powdery cleaner. The surfactant is an ethoxylated and then propoxylated fatty alcohol. The fatty alcohol has 12 to 18, preferably 12 to 14 carbon atoms and is ethoxylated with 1 to 5, preferably 1 to 3 mols of ethylene oxide and then with 2 to 7, preferably with 4 to 6 mols of propylene oxide. However, powdery formulations are not very convenient for handling and transporting. For example, powdery formulations cause dust problems and the humidity of powdery formulations has to be carefully controlled in order to prevent caking.

Furthermore, it is sometimes difficult to completely dissolve such powder compositions in water prior to or during their use.

U.S. Pat. No. 4,206,074 teaches that cleaning processes entailing high mechanical stresses, e.g. mechanical dishwashing or bottlewashing requires a surfactant which is very low foaming whilst giving good wetting and cleaning power. The U.S. patent discloses a low-foaming surfactant system which is based on block copolymers of ethylene oxide and propylene oxide and/or their derivatives. Specifically the U.S. patent discloses a surfactant system which comprises (a) 50 to 90 percent of an oxyalkylated fatty alcohol of 8 to 22 carbon atoms and/or of an oxyethylation product of propylene glycol and/or an oxyalkylation product of ethylene diamine and (b) 10 to 50 percent of a block copolymer obtained by oxyethylating dipropylene glycol and then oxypropylating the product. The oxyalkylated fatty alcohol is produced by first reacting the alcohol with 5 to 20 mols of ethylene oxide and then with 5 to 20 mols of propylene oxide. Ethylene oxide and propylene oxide may also be used as a mixture to form the adduct. The surfactant system is incorporated in a powdery dishwashing detergent. Unfortunately, the block copolymer (b) is poorly biodegradable. Furthermore, some components of the surfactant composition, such as the oxyalkylated fatty alcohols (a), are not sufficiently soluble in aqueous alkaline compositions containing large amounts of alkali hydroxide.

Accordingly, it is still desirable to provide a new aqueous composition which is useful for various purposes, for example to clean the surface of articles like fruit, vegetables or food containers, for chemical peeling of fruit or vegetables, for metal degreasing or mercerization of cellulosic articles.

SUMMARY OF THE INVENTION

One aspect of the present invention is an aqueous composition comprising a non-ionic surfactant and an alkali metal hydroxide, which is characterized in that the non-ionic surfactant is a propylene oxide-ethylene oxide derivative of an alcohol (ROH), of Formula I

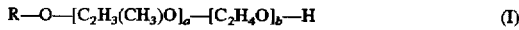

$$R-O-[(C_2H_3(CH_3)O]_a-[C_2H_4O]_b-H \quad (I)$$

and/or a butylene oxide-ethylene oxide derivative of an alcohol (ROH), of Formula II

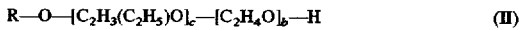

$$R-O-[C_2H_3(C_2H_5)O]_c-[C_2H_4O]_b-H \quad (II)$$

wherein

R is a linear or branched-alkyl or alkenyl group containing from 4 to 11 carbon atoms, a (the average degree of propoxylation per mole) is from 2.5 to 7, b (the average degree of ethoxylation per mole) is from 1 to 10, and c (the average degree of butoxylation per mole) is from 0.5 to 4.

Another aspect of the present invention is the use of the composition of the present invention for cleaning purposes, preferably for washing articles like fruit, vegetables or food containers or for metal degreasing. Yet another aspect of the present invention is the use of the composition of the present invention for chemical peeling of fruit or vegetables or for mercerization of cellulosic materials. The composition of the present invention is optionally diluted with water and/or a water-miscible organic solvent before it is contacted with articles to be cleaned, fruit or vegetables to be peeled or cellulosic articles to be mercerized.

Yet another aspect of the present invention is a method of cleaning articles with the composition of the present invention, which method comprises the step(s) of (a) optionally diluting the aqueous composition with water or with a water-miscible organic solvent or both, and (b) contacting an effective amount of the optionally diluted composition with one or more articles to be cleaned.

Yet another aspect of the present invention is a method of chemical peeling of fruit or vegetables or of mercerization of cellulosic materials with the composition of the present invention, which method comprises the step(s) of (a) optionally diluting the aqueous composition with water or with a water-miscible organic solvent or both, and (b) contracting an effective amount of the optionally diluted composition with the fruit or vegetables to be peeled or with the cellulosic materials to be mercerized.

The aqueous composition comprises a propylene oxide-ethylene oxide derivative of an alcohol (ROH), of Formula I

$$R-O-[(C_2H_3(CH_3)O]_a-[C_2H_4O]_b-H \quad (I)$$

and/or a butylene oxide-ethylene oxide derivative of an alcohol (ROH), of Formula II

$$R-O-[C_2H_3(C_2H_5)O]_c-[C_2H_4O]_b-H \quad (II)$$

It has surprisingly been found that a propylene oxide-ethylene oxide derivative of an alcohol (ROH), of formula I has a higher solubility in aqueous alkaline compositions than a corresponding ethylene oxide-propylene oxide derivative of the same alcohol which has the same molar ratio between alcohol, ethylene oxide and propylene oxide. It has been found that the compounds of Formulas I and II above have a relatively high solubility in strongly alkaline aqueous compositions. Accordingly, the aqueous alkaline composition of the present invention can be produced as a concentrate and diluted later. This allows a significant savings in transportation and packaging costs. Furthermore, the compounds of Formulas I and II are low-foaming and have good wetting properties. Moreover, the compounds of Formulas I and II are biodegradable and generally have a low acute aquatic toxicity.

DETAILED DESCRIPTION OF THE INVENTION

In Formula I a is from 2.5 to 7, preferably from 3 to 6.5, more preferably from 3.5 to 6, most preferably, a is higher than b.

In Formula II c is from 0.5 to 4, preferably from 1 to 3, more preferably from 1 to 2.

In Formulas I and II b is from 1 to 10, preferably from 1 to 9, more preferably from 2 to 7, most preferably from 3 to 6.

R is a linear or branched-alkyl or alkenyl group containing from 4 to 11, preferably from 6 to 10, more preferably from 7 to 9 carbon atoms, such as the butyl, butenyl, pentyl, pentenyl, hexyl, hexenyl, heptyl, heptenyl, octyl, octenyl, nonyl, nonenyl, decyl, decenyl, undecyl or undecenyl. The group R may be branched which is for example the case in 1-methyl-propyl, 2-methyl-propyl, tert-butyl, isopentyl, 2-methyl-butyl, tert-pentyl, isohexyl, isoheptyl, isooctyl, etc. The group R may be unsaturated which is, for example, the case in 2-butenyl, 3-butenyl, etc. However, the group R preferably is a linear alkyl group containing the above-mentioned ranges of carbon atoms. The most preferred group R is the linear octyl group.

R and b in Formula I can be the same or different from R and b in Formula II.

The compounds of Formula I and/or II can be utilized in combination with other non-ionic or ionic surfactants.

Propylene oxide-ethylene oxide derivatives of alcohols are generally known. They can be produced in a known manner by reacting alcohols first with propylene oxide and then with ethylene oxide. The published German patent application 41 15 149 discloses an alkoxylation of fatty alcohols wherein 1 to 20 mols of ethylene oxide and/or propylene oxide are reacted with one mol of a fatty alcohol containing 6 to 24 carbon atoms.

U.S. Pat. No. 4,965,014 discloses a liquid non-ionic surfactant mixture comprising compounds of formula R—O—(PO)$_{1-2}$—(EO)$_{6-8}$—H, wherein PO is the residue of a ring-opened propylene oxide, EO is the residue of a ring-opened ethylene oxide and R is a mixture of alkyl or alkenyl moieties of a specific distribution wherein 75 to 90 percent of the alkyl or alkenyl moieties contain 9 or 10 carbon atoms. The non-ionic surfactant mixture is a component of a solid or liquid detergent composition which apparently does not contain an alkali hydroxide.

U.S. Pat. No. 4,784,798 discloses a demulsifying cleaning preparation which consists of a builder/complexing agent, at least one non-ionic surfactant, water, a solution promoter and corrosion inhibitors. The presence of an alkali hydroxide is not disclosed in the cleaning preparation. The disclosed non-ionic surfactants are adducts of 4 mols of ethylene oxide with n- or i-octanol or adducts of 2 mols of propylene oxide and 5 to 6 mols of ethylene oxide with n- or i-octanol.

Trials by the Applicants have shown that at least the preferred embodiments of the non-ionic surfactants of Formulas I or II above have a higher solubility and foam less in concentrated alkaline aqueous compositions than the surfactants disclosed in U.S. Pat. Nos. 4,965,014 and 4,784,798.

The published European Patent Application 0,034,194 discloses a method of producing a granular washing and cleaning composition wherein a non-ionic surfactant is mixed with a powdery to granular component of the composition and this mixture is combined with the other components of the washing and cleaning composition. The non-ionic surfactant is a compound of formula

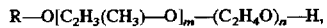

wherein R is an aliphatic hydrocarbon group containing 8 to 20, preferably 12 to 18 carbon atoms, m is 0.5 to 8, preferably 1 to 5, and n is 2 to 20, preferably 3 to 15, with the proviso that n is equal to or higher than m, preferably 2 to 10 times as high as m. The European patent application discloses a wide variety of component of the washing and cleaning composition, such as builder salts, polymeric phosphates, skeleton substances, complexing agents, optical brighteners, etc. The inclusion of an alkali metal hydroxide into the washing and cleaning composition is not disclosed. As indicated above, powdery formulations are not very convenient for handling and transporting. For example, powdery formulations cause dust problems and the humidity of powdery formulations has to be carefully controlled in order to prevent caking.

U.S. Pat. No. 4,280,919 discloses a detergent and cleanser which contains an oxyalkylated alcohol of the formula:

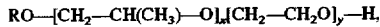

wherein R is C$_{8-18}$-alkyl, x is from 2 to 4.5 and y is from 2 to 5 as a low foam, biodegradable surfactant additive. It is disclosed that these oxyalkylated alcohols have a relatively poor solubility in water. A detergent and cleanser formulation is disclosed which contains as other additives, in addition to the oxyalkylated alcohol, builders, softeners and bleaching agents. Builders may be phosphates or phosphate substitutes, such as polyacrylic acid, polymalic acid, maleic acid/vinyl ether copolymers, nitriloacetic acid, or inorganic substances, e.g. zeolites. They additionally contain fillers, e.g. sodium sulfate and sodium carbonate. Detergents for dishwashing contain up to 99.5 percent by weight of builders and alkaline compounds, such as sodium carbonate and 0.5 to 5 percent of the oxyalkylated alcohol. The inclusion of an alkali metal hydroxide into the detergent composition is not disclosed in U.S. Pat. No. 4,280,919. Furthermore, the disclosed detergent composition is evidently powdery. As indicated further above, powdery cause dust problems and the humidity of powdery formulations has to be carefully controlled in order to prevent caking. Furthermore, it is sometimes difficult to completely dissolve the powder composition in water. Therefore, the disclosed detergent composition is not very convenient for transporting and handling.

British Patent Application GB-A-2,145,726 discloses a biodegradable oxyalkylated alcohol useful in detergent and rinsing compositions having the formula:

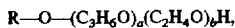

where R is an alkyl group of 6 to 10 carbon atoms, (a) has a mean value of 4.5 to 9 and (b) has a mean value of 2 to 8. The oxyalkylated alcohol can be combined with alkaline builders and sequestering agents for producing a detergent composition. A preferred example of the solid detergent composition consists of 30 weight percent of sodium tripolyphosphate, 25 weight percent of sodium metasilicate, 34 to 32 weight percent of sodium carbonate, 10 weight percent of trisodium phosphate and 1 to 3 weight percent of the oxyalkylated alcohol. As indicated above, solid detergent compositions are difficult to be transported and handled. Alternatively, rinsing agents may be formulated as aqueous solutions of the oxyalkylated alcohol, optionally together with sequestering agents, acidic materials and defoaming agents. The use of an alkali metal hydroxide in a high concentration is not suggested in the British patent application.

U.S. Pat. No. 5,126,068 discloses an aqueous hard surface cleaning composition which comprises (a), as a surfactant, (i) a polyoxyethylene/polyoxypropylene block copolymer having a number average molecular weight of 3000–7000 or (ii) an alcohol ethoxylate of the formula:

wherein R is C$_{8-15}$-alkyl, x is 4 to 15, y is 0 to 15 and z is 0 to 5 and (b) 3 to 5 percent by weight organic solvents and water.

The surfactant may be used either alone or in combination with certain polycarboxylates as cleaning ingredients in glass cleaners.

Polyoxyalkylene polyethers terminated with oxyethylene groups can be used as non-ionic surfactants, preferably those produced by first oxypropylating an initiator and subsequently oxyethylating the resulting compound. The pH of the cleaning composition is adjusted by adding 0.1 to 0.5 weight percent of an alkaline salt of the metals from Group I or II of the periodical table, such as potassium and sodium salts or alkaline hydroxides, such as ammonium hydroxide. The use of an alkali metal hydroxide in a high concentration is not suggested in the British patent application.

Based on the above-discussed teachings the usefulness of the compounds of Formulas I and II above in strongly alkaline aqueous solutions could not be expected. Particularly their high solubility in strongly alkaline aqueous compositions is surprising. Generally the solubility of the compounds of Formulas I and II in a 45 weight percent aqueous solution of sodium hydroxide, measured as indicated further below in the examples, is at least 0.8 weight percent, preferably at least 1.0 weight percent, more preferably at least 1.25 weight percent.

The aqueous alkaline composition of the present invention comprises one or more alkali metal hydroxides. Exemplary thereof are lithium hydroxide, or preferably, sodium hydroxide or potassium hydroxide. The composition of the present invention can contain the alkali metal hydroxide in a concentration up to its saturation point. For example, the solubility of sodium hydroxide is 42 g/100 mL solution at 0° C. and 347 g/100 ml solution at 100° C. respectively. The solubility of potassium hydroxide is 107 g/100 mL solution at 15° C. and 178 g/100 mL solution at 100° C. The aqueous composition of the present invention comprises at least 5 percent of the alkali metal hydroxide, based on the total weight of the aqueous composition.

The aqueous composition of the present invention preferably comprises a solubilizer in addition to the alkali metal hydroxide, one or more compounds of Formulas I and/or II and water. The solubilizer increases the solubility of the compounds of Formulas I and II in the alkaline composition. Useful solubilizers are fatty acid esters of mono- or disaccarides or of sucroglycerides, such as the mono- or distearates, mono- or dipalmitates or mono- or dioleates of saccharose, alkyl polyglucosides, such as Triton™ BG 10, esters of polyethoxylated polyols, polyethoxylated lanoline, mono- and dialkyl-diphenyloxide disulfonic acids or alkaline salts thereof, such as Dowfax™ 3B2, alkanolamides of fatty acids, sucroglycerides of alkyl ethoxylates or anionic phosphate esters or their acidic forms, such as Triton™ H 66.

A portion of the water which is comprised in the aqueous composition of the present invention may be replaced by a water-miscible organic solvent, such as a water-miscible alcohol like methanol or ethanol. Generally, the amount of the water-miscible solvent, if present, is less that 50 percent, preferably less than 20 percent, more preferably less that 10 percent and most preferably less than 5 percent, based on the total weight of water and water-miscible solvent.

Advantageously, the aqueous composition of the present invention is first prepared as a concentrated solution and then diluted prior to its use with water and/or a water-miscible solvent. This method results in a considerable saving of transporting and packaging costs. The concentrated aqueous solution can be shipped to the end-user who can dilute the concentrate prior to its use. Accordingly, the unexpectedly high solubility of the compounds of Formulas I and/or II in aqueous compositions with a high content of an alkali metal hydroxide is very important for the present invention.

When preparing a concentrated aqueous alkaline composition, it preferably comprises from 0.01 to 5 percent, more preferably from 0.15 to 2.5 percent, most preferably from 0.2 to 2 percent of one or more compounds of Formulas I and/or II, based on the total weight of the aqueous alkaline composition. If the composition comprises more than one compound of Formulas I and/or II, their total weight preferably is within the indicated range. The concentrated aqueous alkaline composition of the present invention comprises at least 5 percent, preferably at least 15 percent, more preferably at least 30 percent, most preferably at least 40 percent of alkali metal hydroxide, based on the total weight of the composition. The upper limitation is the concentration at saturation or a little less, i.e. about 50 percent in the case of sodium hydroxide and about 70 percent in the case of potassium hydroxide, based on the total weight of the composition. Preferably a concentrated aqueous alkaline composition contains up to 50 percent, more preferably up to 48 percent, of an alkali metal hydroxide, based on the total weight of the composition. If present, the amount of a solubilizer in the concentrated aqueous composition of the present invention generally is from 0.01 to 7 percent, preferably from 0.15 to 4 percent, more preferably from 0.2 to 3 percent, based on the total weight of the composition. A concentrated aqueous alkaline composition of the present invention generally comprises water and/or a water-miscible organic solvent in a total amount of from 30 to 94.98 percent, preferably from 40 to 90 percent, more preferably from 50 to 80 percent, based on the total weight of the aqueous alkaline composition.

The aqueous alkaline composition of the present invention may contain optional additives, such as defoamers, corrosion inhibitors, chelating agents, thickening agents, perfumes, coloring agents, etc. If present, their amount generally is from 0.001 to 5 percent, preferably from 0.01 to 4 percent, most preferably from 0.1 to 4 percent, based on the total weight of the aqueous composition, as discussed above. Such optional additives are known in the art.

Preferably, one or more compounds of Formula I and/or II, one or more alkali metal hydroxides, the solubilizer(s), if present, and water amount to 90 percent or more, preferably to 95 percent or more, more preferably to 96 percent or more of the total weight of the concentrated aqueous alkaline composition. Most preferably, the aqueous alkaline composition of the present invention essentially consists of one or more compounds of Formulas I and/or II, one or more alkali metal hydroxides, the optional solubilizer(s) and water.

The aqueous alkaline composition of the present invention is liquid at room temperature. It is usually prepared by mixing the various components of the composition in a known manner. For example, one or more compounds of Formulas I and/or II may be mixed in a first step with the solubilizer and water and in a second step with alkali metal hydroxide, preferably with a concentrated aqueous solution of the alkali metal hydroxide. Alternatively, all components of the composition of the present invention may be mixed in a single step. The mixing temperature is not critical. Room temperature is the most convenient one. However, decreased or elevated temperatures are also useful.

When a concentrated aqueous alkaline composition is prepared which comprises the various components of the composition in the above described concentrations, it can be diluted with water and, optionally, with an water-miscible organic solvent at any ratio. Preferably, water is the only diluent. The weight ratio between the concentrated alkaline composition as described above and the diluent generally is from 1:1 to 1:1000, preferably from 1:4 to 1:500, ore preferably from 1:9 to 1:99. The suitable concentrations of the components of the alkaline composition which is ready for use vary depending on the intended use of the alkaline composition. For some applications, such as the mercerization of cellulosic articles, the concentrated composition can be directly used without previous dilution or with little dilution.

Depending on its use, alkaline composition of the present invention which is ready for use preferably comprises from 0.0001 to 0.5 percent, more preferably from 0.0015 to 0.25 percent, most preferably from 0.002 to 0.2 percent of one or more compounds of formulas I and/or II, preferably from 0.1 to 5 percent, more preferably from 0.2 to 5 percent, most preferably from 0.4 to 5 percent of one or more alkali metal hydroxides, optionally a solubilizer, preferably in an amount of from 0.0001 to 0.7 percent, more preferably from 0.0015 to 0.4 percent, most preferably from 0.002 to 0.3 percent, and from 90 to 99.998, preferably from 92 to 99.5, most preferably from 94 to 99 percent of water, based on the total weight of the composition. Optional additives, such as defoamers, corrosion inhibitors, chelating agents, thickening agents, perfumes, coloring agents, etc. are preferably comprised in a composition which is ready for use in an amount of from 0.0001 to 0.5 percent, preferably from 0.005 to 0.4 percent, most preferably from 0.01 to 0.4 percent, based on the total weight of the composition.

The optionally diluted composition of the present invention is very useful for cleaning the surface of articles, for example, for washing fruit or vegetables, for metal degreasing or washing containers for food, such as dishes or bottles etc. Such containers can be made of glass, plastic material, metals etc. Furthermore, the optionally diluted composition of the present invention is useful for chemical peeling of fruit or vegetables or for mercerization of cellulosic materials. In the mercerization of cellulosic textiles, such as cotton or linen in yarn or fabric form, the fibres are swollen whereby the strength and the dye affinity of the fibres are increased. The optionally diluted composition of the present invention is particularly suitable for treating such articles which are commonly treated with alkaline liquid compositions. The articles may be treated in a known way by contacting the articles with an effective amount of the optionally diluted composition of the present invention. The effective amount depends on the type of articles, the type and amount of impurities on the articles, the specific composition, etc. The minimum effective amount can be evaluated by series trials. Because the compounds of Formulas I and II have a relatively high solubility in strongly alkaline aqueous compositions, aqueous alkaline compositions can be provided which are very efficient cleaning and washing agents. Furthermore, at least the preferred embodiments of the aqueous alkaline composition of the present invention are low-foaming, which is particularly desirable in automatic washing processes. Moreover, at least the preferred embodiments of the aqueous alkaline composition have good wetting properties. Good wetting properties are important for achieving a good cleaning result.

The present invention is further illustrated by the following examples which should not be construed to limit the scope of the invention. Unless otherwise indicated, all parts and percentages are by weight.

EXAMPLES 1 TO 14 AND COMPARATIVE EXAMPLES A TO F

The non-ionic surfactants in Examples 1 to 14 and Comparative Example F have been produced by reacting n-octanol first with propylene oxide or with butylene oxide and then with ethylene oxide in a known manner.

The non-ionic surfactant in Comparative Example A has been produced by reacting n-octanol first with ethylene oxide and then with propylene oxide in a known manner.

The non-ionic surfactant in Comparative Example B is believed to be the reaction product of a mixture of oxo-alcohols of an average chain length of 13 carbon atoms with ethylene oxide and then with propylene oxide; it is commercially available as Plurafac LF 400.

The non-ionic surfactant in Comparative Example C is believed to be the reaction product of a mixture of linear $C_{12+14}$-alcohols with ethylene oxide and then with butylene oxide in a known manner; it is commercially available as Plurafac LF 221.

The non-ionic surfactant in Comparative Example D is believed to be the reaction product of a mixture of oxo-alcohols of an average chain length of 13 carbon atoms with ethylene oxide and then with butylene oxide; it is commercially available as Plurafac LF 224.

The non-ionic surfactant in Comparative Example E is believed to be the reaction product of a mixture of oxo-alcohols of an average chain length of 13 carbon atoms with propylene oxide and then with ethylene oxide in a known manner; it is commercially available as Plurafac LF 403.

The chemical structures of these surfactants are listed in Table 1 in an abbreviated form. For example, "$C_8$+7PO+5EO" in Example 1 means that n-octanol has first been reacted with propylene oxide and then with ethylene oxide in a molar ratio of n-octanol:propylene oxide:ethylene oxide of 1:7:5. "BO" means butylene oxide.

It should be noted that aqueous compositions containing an alkali metal hydroxide and an alkoxylated alcohol listed in Comparative Examples A to E are not disclosed in the prior art.

The solubility of the alkoxylated alcohols listed in Table 1 in a 45 percent aqueous solution of sodium hydroxide is measured as follows:

An alkyl polyglucoside, commercially available as Triton™ BG 10, is used as a solubilizer. 3 parts of the solubilizer and 5 parts of deionized water are mixed. 2 parts of a mixture of an alkoxylated alcohol and water are added. Then 90 parts of a 50 percent aqueous solution of sodium hydroxide is slowly added and the resulting mixture is visually inspected as to whether it is clear or cloudy. The composition of the mixture of alkoxylated alcohol and water is varied such that the concentration of the alkoxylated alcohol in the resulting alkaline solution is 0.25 percent, 0.5 percent, 0.75 percent, 1.0 percent, 1.25 percent, 1.5 percent, 1.75 percent or 2.0 percent respectively.

The wetting ability of an aqueous alkaline composition containing an alkoxylated alcohol listed in Table 1 is measured as follows:

A solution is prepared consisting of 0.3 percent Triton™ BG 10 solubilizer, 0.1 percent of an alkoxylated alcohol, 4.5 percent of sodium hydroxide and 95.1 percent of deionized water are mixed. A cotton disk is tied with a tread to a weight. The cotton disk is immersed into the test solution. The time is measured when the cotton disk starts to sink. This time is listed as wetting time. The shorter the wetting time is, the better is the wetting ability of the solution. If the test solution does not contain an alkoxylated alcohol, the wetting time is 72 sec.

The foaming of an aqueous alkaline composition containing an alkoxylated alcohol listed in Tables 1 and 2 is measured according to a modified version of ASTM D 1173. The test is conducted at room temperature. 3.2 ml of an aqueous solution consisting of 3 percent Triton™ BG 10 solubilizer, 1 percent of the alkoxylated alcohol, 45 percent of sodium hydroxide and 51 percent of deionized water are filled into a foam receiver described in ASTM D 1173. A foam pipette described in ASTM D 1173 is filled with 200 ml of tap water having an alkaline earth metal ion concentration of 1.6 mmol/l. The stop watch is started when the entire amount of water has run out of the pipette. In Table 1 below only the foam height at 0 sec. is listed. The foam height is measured at 0 sec., 0.5 min, 1 min, 1.5 min, 2 min, 2.5 min and 3 min. These results are listed in Table 2.

TABLE 1

| Example | Average Formula | Solubility in 45% NaOH | Foaming (cm at 0 sec.) | Wetting time (in sec.) |
|---|---|---|---|---|
| 1 | $C_8$ + 7PO + 5EO | 1.25% | 1.8 | 11 |
| 2 | $C_8$ + 5PO + 4EO | 1.75% | 2 | 10 |
| 3 | $C_8$ + 5PO + 5EO | 1.25% | | |
| 4 | $C_8$ + 5PO + 6EO | 1.25% | | |
| 5 | $C_8$ + 4.5PO + 4EO | 1.5% | 1.5 | 8 |
| 6 | $C_8$ + 4.5PO + 5EO | 1.5% | | |
| 7 | $C_8$ + 4PO + 4EO | 1.25% | 2.3 | 7 |
| 8 | $C_8$ + 4PO + 5EO | 1.5% | 2 | 8 |
| 9 | $C_8$ + 1BO + 4EO | 1.5% | 1 | 7 |
| 10 | $C_8$ + 1BO + 5EO | 1.25% | | |
| 11 | $C_8$ + 1BO + 6EO | 1.0% | | |
| 12 | $C_8$ + 2BO + 4EO | 1.5% | 0.8 | 8 |
| 13 | $C_8$ + 2BO + 5EO | 1.25% | | |
| 14 | $C_8$ + 2BO + 6EO | 1.0% | | |
| A | $C_8$ + 4EO + 5PO | 0.5% | 2 | 9 |
| B | $C_{12-15}$ + 6EO + 4PO | 0.75% | 2.5 | 22 |
| C | $C_{12-14}$ + 10EO + 2BO | 0.5% | 2.0 | 20 |
| D | $C_{12-15}$ + 4.8EO + 1.9BO | 0.5% | | |
| E | $C_{12-15}$ + 4.9PO + 2.2EO | 1.25% | 2.5 | 29 |
| F | $C_8$ + 2PO + 5EO | 1% | 5 | 8 |

The comparison between Examples 1 to 14 and Comparative Examples A to E respectively illustrate that the solubility of the compounds of Formulas I and II in strongly alkaline aqueous compositions is generally higher than the solubility of the alkoxylated alcohols in the comparative examples. Table 1 also illustrates that the compounds of Formula I and II generally have an equal or better wetting behavior than the alkoxylated alcohols in the comparative examples. Furthermore, the solutions of the alkoxylated alcohols in Comparative Examples A to E are generally not stable and have a cloudy appearance.

TABLE 2

| Time (min.) | FOAM HEIGHT IN CM Example | | | | | | | |
| | 1 | 2 | 11 | 12 | A | B | G | —*) |
|---|---|---|---|---|---|---|---|---|
| 0 | 1.8 | 2 | 1.5 | 0.8 | 2 | 2.5 | 5 | 3.5 |
| ½ | 0.5 | 0.8 | 0.8 | 0 | 1.2 | 2 | 2.8 | 2 |
| 1 | 0.3 | 0.8 | 0.8 | 0 | 1.0 | 2 | 2.5 | 1.5 |
| 1½ | 0.3 | 0.3 | 0.5 | 0 | 0.8 | 2 | 2 | 1.5 |
| 2 | 0.2 | 0.2 | 0.5 | 0 | 0.6 | 1.8 | 1.5 | 1.2 |
| 2½ | — | 0.2 | 0.3 | 0 | 0.5 | 1.6 | 1.5 | 1.0 |
| 3 | — | 0.1 | 0.3 | 0 | 0.5 | 1.5 | 1.3 | 0.8 |

*)composition without alkoxylated alcohol

The results listed in the last column in Table 1 and in Table 2 illustrate that the compounds of Formulas I and II generally are equally or less foaming than the alkoxylated alcohols in the comparative examples.

What is claimed is:

1. An aqueous composition comprising
   (i) a non-ionic surfactant selected from the group consisting of butylene oxide-ethylene oxide derivatives of an alcohol (ROH), of Formula II R—O—[C₂H₃(C₂H₅)O]_c—[C₂H₄O]_b—H   (II)

wherein
   R is a linear or branched alkyl or alkenyl group containing from 4 to 11 carbon atoms,
   b (the average degree of ethoxylation per mole) is from 1 to 10, and
   c (the average degree of butoxylation per mole) is from 0.5 to 4,
   (ii) at least about 5 percent of an alkali metal hydroxide, based on the total weight of the aqueous composition and
   (iii) a solubilizer selected from the group consisting of fatty acid esters of mono- and disaccharides and of sucroglycerides, alkyl polyglucosides, esters of polyethoxylated polyols, polyethoxylated lanolin, mono- and dialkyl-diphenyloxide disulfonic acids and alkaline salts thereof, alkanolamides of fatty acids, sugroglycerides of alkyl ethoxylates and anionic phosphate esters and their acidic forms.

2. The composition of claim 1 wherein c in Formula II is from 1 to 3.

3. The composition of claim 1 wherein the group R in Formula II contains from 6 to 10 carbon atoms.

4. The composition of claim 2 wherein the group R in Formula II contains from 6 to 10 carbon atoms.

5. The composition of claim 1 wherein in Formula II c is from 1 to 2, b is from 2 to 7 and the group R contains from 7 to 9 carbon atoms.

6. The composition of claim 1 wherein in Formula II c is from 1 to 2, b is from 4 to 6 and the group R contains 8 carbon atoms.

7. The composition of claim 1 wherein the concentration of the alkali metal hydroxide is from about 5 to about 50 percent, based on the total weight of the composition.

8. The composition of claim 1 comprising from about 0.01 to about 5 percent of one or more non-ionic surfactants (i), from about 5 to about 50 percent of one or more alkali metal hydroxides, from about 0.01 to about 7 percent of said solubilizer and from about 30 to about 94.98 percent of water, all percentages being based on the total weight of the composition.

9. The composition of claim 5 comprising from about 0.01 to about 5 percent of one or more non-ionic surfactants (i), from about 5 to about 50 percent of one or more alkali metal hydroxides, from about 0.01 to about 7 percent of said solubilizer and from about 30 to about 94.98 percent of water, all percentages being based on the total weight of the composition.

10. An aqueous composition comprising
    (i) a non-ionic surfactant selected from the group consisting of butylene oxide-ethylene oxide derivatives of an alcohol (ROH), of Formula II R—O—[C₂H₃(C₂H₅)O]_c—[C₂H₄O]_b—H   (II)

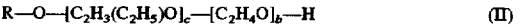

wherein
    R is a linear or branched alkyl or alkenyl group containing from 4 to 11 carbon atoms, b (the average degree of ethoxylation per mole) is from 1 to 10, and c (the average degree of butoxylation per mole) is from 0.5 to 4 and (ii) at least about 5 percent of an alkali metal hydroxide, based on the total weight of the aqueous composition.

11. The composition of claim 10 wherein c in Formula II is from 1 to 3.

12. The composition of claim 10 wherein the group R in Formula II contains from 6 to 10 carbon atoms.

13. The composition of claim 10 wherein in Formula II c is from 1 to 2, b is from 2 to 7 and the group R contains from 7 to 9 carbon atoms.

14. An aqueous composition comprising (i) from about 0.0001 to about 0.5 percent of one or more non-ionic surfactants selected from the group consisting of butylene oxide-ethylene oxide derivatives of an alcohol (ROH), of Formula II

$$R-O-[C_2H_3(C_2H_5)O]_c-[C_2H_4O]_b-H \qquad (II)$$

wherein

R is a linear or branched alkyl or alkenyl group containing from 4 to 11 carbon atoms, b (the average degree of ethoxylation per mole) is from 1 to 10, and c (the average degree of butoxylation per mole) is from 0.5 to 4, (ii) from about 0.1 to about 5 percent of one or more alkali metal hydroxides, optionally from about 0.0001 to about 0.7 percent of a solubilizer selected from the group consisting of fatty acid esters of mono- or disaccharides or of sucroglycerides, alkyl polyglucosides, esters of polyethoxylated polyols, polyethoxylated lanolin, mono- and dialkyl-diphenyloxide disulfonic acids or alkaline salts thereof, alkanolamides of fatty acids, sucroglycerides of alkyl ethoxylates and anionic phosphate esters or their acidic forms and from about 90 to about 99.998 percent of water, all percentages being based on the total weight of diluted composition.

\* \* \* \* \*